United States Patent [19]

Stephens et al.

[11] 3,922,244

[45] Nov. 25, 1975

[54] THERMOSETTING WATER-BASED COATINGS

[75] Inventors: Dwight L. Stephens; Jeffrey D. Lord, both of Ross Township, Pa.

[73] Assignee: Mobil Oil Corporation, New York, N.Y.

[22] Filed: Mar. 15, 1974

[21] Appl. No.: 451,404

[52] U.S. Cl. .............. 260/29.7 UA; 260/29.7 AT; 260/29.7 H; 260/29.7 NR; 260/29.7 W; 260/852; 260/854; 260/855; 260/856
[51] Int. Cl.[2]. C08L 9/08; C08L 23/08; C08L 61/28
[58] Field of Search ........ 260/29.7 H, 29.7 W, 29.7, 260/ UA, 29.7 AT, 29.7 NR, 29.4 UA, 852, 854, 855, 856

[56] References Cited
UNITED STATES PATENTS

| | | | |
|---|---|---|---|
| 2,859,193 | 11/1958 | Kowalewski | 260/29.7 H |
| 2,901,448 | 8/1959 | Kraus | 260/29.7 H |
| 2,904,526 | 9/1959 | Uelzmann | 260/29.7 H |
| 2,952,564 | 9/1960 | Traverso | 260/29.7 H |
| 2,952,565 | 9/1960 | Contois | 260/29.7 H |
| 3,165,423 | 1/1965 | Caldwell et al. | 260/29.4 UA X |
| 3,214,488 | 10/1965 | O'Donnell et al. | 260/29.4 UA X |
| 3,300,428 | 1/1967 | Schmidt | 260/29.4 |
| 3,440,184 | 4/1969 | Erickson | 260/29.7 H |
| 3,753,941 | 8/1973 | Teumac et al. | 260/29.7 H |
| 3,770,572 | 11/1973 | Henry et al. | 260/29.7 W |
| 3,809,666 | 5/1974 | Chick et al. | 260/29.7 W |

FOREIGN PATENTS OR APPLICATIONS

| | | |
|---|---|---|
| 810,575 | 3/1959 | United Kingdom |
| 970,115 | 9/1964 | United Kingdom |

*Primary Examiner*—Melvin Goldstein
*Assistant Examiner*—T. DeBenedictis, Sr.
*Attorney, Agent, or Firm*—Charles A. Huggett; Hastings S. Trigg

[57] ABSTRACT

A thermosetting water-based coating comprises the ammonium salt of an ethylene/acrylic acid copolymer, a carboxyl modified styrene/butadiene latex optionally a pigment, and a conventional aminoplast in an aqueous vehicle. When the coating is applied to a paper substrate, such as paper cups, a durable waterproof finish is produced.

6 Claims, No Drawings

3,922,244

THERMOSETTING WATER-BASED COATINGS

BACKGROUND OF THE INVENTION

Field of the Invention

This invention is concerned with novel water-based coatings containing the ammonium salt of an ethylene-acrylic acid copolymer, carboxyl modified styrene-butadiene latex, and an aminoplast.

SUMMARY OF THE INVENTION

This invention provides a thermosetting water-based coating containing the ammonium salt of an ethylene-acrylic acid copolymer, carboxyl modified styrene-butadiene latex and an aminoplast.

DESCRIPTION OF SPECIFIC EMBODIMENTS

One component of the coating is the ammonium salt of an ethylene-acrylic acid copolymer, i.e., such copolymer that has been completely neutralized with ammonium hydroxide. Various amines have been tried in place of ammonium hydroxide, but they all imparted poor Rheology and caused coating problems. Any strength ammonium hydroxide that is available can be used, but it is preferred to use the usual commercial strength solution, i.e., one containing 28–29 weight percent $NH_3$. The neutralized copolymer is generally dissolved in water to form a solution having a total solids of about 15% to about 25%.

The ethylene-acrylic acid copolymer is a random copolymer of ethylene and acrylic acid containing between about 15 weight percent and about 25 weight percent acrylic acid, preferably about 20 weight percent. It has a density in the range of high density polyethylene. The copolymers utilizable herein are available commercially and can be prepared using a Ziegler catalyst and well known techniques for carrying out polymerization to produce high density polyethylene.

The carboxyl modified-styrene-butadiene latex is basically a styrene-butadiene polymer which has an unsaturated carboxylic acid copolymerized therewith, i.e., a terpolymer of styrene, butadiene, and an unsaturated carboxylic acid. It is a colloidal suspension of the terpolymer in water. Such latex terpolymer is readily prepared by well known emulsion techniques using an initiator, such as peroxide. The amount of styrene in the terpolymer can be between about 50 weight percent and about 70 weight percent. The amount of unsaturated carboxylic acid, such as acrylic acid, methacrylic acid and itaconic acid will be sufficient to afford an acid number (A.N.) of 15–25 for the terpolymer. The amount of unsaturated carboxylic acid used will not exceed 10 weight percent. The balance of the terpolymer is butadiene.

Although a pigment is not necessary, it is preferred to incorporate a pigment into the coating composition of this invention. The preferred pigment is titanium dioxide, but any well known filler pigment can be used, such as zinc oxide, bentonite, silica, ochers, and chrome yellows, greens, oranges, etc. A feasible method for incorporating the pigment into the coating composition is first to admix it with part of the carboxyl modified styrene-butadiene latex to form a paste, which can then readily be blended with the other components of the composition.

The material used to thermoset the coating is conventional aminoplast cross-linking agent. Such agents are well known in the art. There can be used any of the thermosetting alkylated aminoplast resins, such as the urea-aldehyde resins, the melamine aldehyde resins, the dicyandiamide-aldehyde resins and other aminoplast-aldehyde resins such as those triazine resins produced by the reaction of an aldehyde with formoguanamine, ammeline, 2-chloro-4,6-diamino-1,3,5-triazine, 2-phenyl-p-oxy-4,6-diamino-1,3,5-triazine, 6-methyl-2,4-diamino-1,3,5-triazine; 2,4,6-trihydrazine-1,3,5-triazine, and 2,4,6-triethyl-triamino-1,3,5-triazine. The mono-, di-, or triaralkyl or mono-, di-, or tri-aryl melamines, for instance 2,4,6-triphenyltriamino-1,3,5-triazine are preferred. As aldehydes used to react with the amino compound to form the resinous material, one may use such aldehydes as formaldehyde, acetaldehyde, crotonic aldehyde, acrolein, or compounds which engender aldehydes, such as hexamethylene-tetramine, paraldehyde, paraformaldehyde, and the like. It is preferred to use an aminoplast that is water soluble.

Other well known adjuvants may be added to the coating composition such as flow control agents and waxes. A preferred flow control agent is sodium dioctyl sulfosuccinate, but others utilizable include sodium dihexyl sulfosuccinate, sodium diamyl sulfosuccinate, isopropyl naphthalene sulfosuccinate, and sorbitan monolaurate, monopalmitate, or monooleate. Waxes, if used, are added as slurries or emulsions of petroleum (paraffin) wax, natural waxes such as montan wax, beeswax, and carnauba wax, or synthetic waxes such as polyethylene wax.

The vehicle used in the coating compositions is water. In some cases, such as where the final coating may be unsatisfactory (uneven, etc.) it may be desirable to recoat the substrate. Accordingly, in order to enhance recoatability it is desirable to include in the vehicle small amounts of alcohols ($C_2$–$C_8$), such as ethanol, isopropanol, hexanol, and 2-ethylhexanol.

The final coating compositions are prepared by mixing the components, using the minimum amount of agitation necessary to achieve uniform mixing and avoid entrapping air bubbles. Suitable ranges of concentration of the components of the coating composition are:

Percent By Weight of Entire Formulation

|  | Ranges |
| --- | --- |
| $NH_4$ ethylene/acrylic acid copolymer | 2–10 |
| Latex (terpolymer) | 20–30 |
| Aminoplast | 1–5 |
| Pigment | 0–20 |
| Wax | 0–3 |
| Vehicle |  |
| water | 45–60 |
| alcohol | 0–4 |

The coating compositions are applied by any method that will not exert high shear force on the coating. Although any paper substrate can be coated with the coating compositions of this invention, the compositions are particularly adaptable to coating the inside of containers, such as paper cups for hot or cold beverages.

After application, the coating is baked at about 3 seconds to about 5 minutes at between about 250°F. and about 450°F. A preferred bake is for about 3 minutes at 300°F.

EXAMPLE 1

In stainless steel equipment fitted with a heating and cooling source, an agitator and a reflux condenser there were heated to 185°F. 58 lb. deionized water, 1.2 lb. 29% ammonium hydroxide and 18 lb. ethylene/acrylic acid copolymer. This copolymer had a density of 0.960 and contained 20 weight percent acrylic acid. There was added an additional 4.4 lb. ammonium hydroxide and the temperature was increased to 195°F. and held at this temperature until complete dispersion was accomplished. (Normal time requirement 1–2 hours). Complete dispersion is evidenced by solution clarity and absence of seeds. At this point there was added 18.4 lb. deionized water and temperature was held for an additional 30 min. at 195°F. The solution was cooled to 80°F. under continued agitation. The final product had a wt. per gallon of 8.30–8.40 lb., a viscosity of 18–25 seconds No. 2 Zahn Cup at 80°F., pH of 9.6–10.6 and a total solids of 17.5–18.5%.

EXAMPLE 2

Using high speed agitation equipment such as a Hockmeyer mixer, there were charged 46.6 lb. carboxyl modified styrene/butadiene latex at 50% solids and 6.8 lb. deionized water. The latex (SK-553 a commercial product of Sinclair-Koppers Co.) was terpolymer latex of (meth)acrylic acid, styrene, and butadiene. The styrene/butadiene ratio was 64/36 and the acrylic acid content gave the latex a pH of 5.5–6.0. Agitation was started and 46.6 lb. titanium dioxide pigment was slowly added. When all pigment had been added, high speed agitation was continued for 1 hour. The resultant paste was highly thixotropic, had a solids of 70% and a wt./gal. of 11.7 lb. On standing, the paste becomes a stiff semi-solid which develops limited fluidity on agitation.

EXAMPLE 3

Using stainless steel mixing equipment with no heat required, minimum agitation was used. There were charged 27.3 lb. carboxyl modified styrene/butadiene latex (SK-553), 36.0 lbs. of paste from Example 2, 18.7 lb. of the product from Example 1 and 3.3 lb. of an alkylated melamine formaldehyde resin supplied at 80% solids in water (Cymel 7273-7 from American Cyanamid). This was stirred until uniform. Under continued agitation were slowly added 4.2 lb. deionized water and 1.9 lb. isopropanol and stirring continued for approximately 15 minutes. Still under minimum agitation there was added 0.4 lb. 2-ethylhexanol and stirred an additional 15 minutes. Still under minimum agitation was slowly added 3.4 lb. of a microcrystalline wax melting in the range of 150°–180°F. and supplied at 50% solids, the balance being water. Increased agitation slightly being careful to not beat in air and stirred for 15 minutes. Finally there was added 4.8 lb. ammonium hydroxide and stirring continued for 15 minutes. Checked for pH and adjusted with more ammonium hydroxide, as necessary, to a final pH of 10–11. The final product has a solids of 46% and a wt./gal. of 9.5–9.6 lb.

In use, the product of Example 3 is injected into paper cups (about 10 ml/cup) which are then spun at 2000 RPM for 1.5 seconds to coat the surface uniformly. The cups are then baked 3 minutes at 300°F. The final dried film weight is 1.0–2 lb./1000 cups.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A thermosetting water based coating composition containing by weight of the composition:
   a. 2–10 percent of the ammonium salt of an ethylene-acrylic acid copolymer containing 15–25 weight percent acrylic acid;
   b. 20–30 percent of a terpolymer of styrene, butadiene, and unsaturated carboxylic acid containing 50–70 weight percent styrene and having an acid number of 15–25;
   c. 1–5 percent of an aminoplast;
   d. 0–20 percent of pigment;
   e. 0–3 percent of wax;
   f. 45–60 percent of water; and
   g. 0–4 percent of $C_2$ to $C_8$ alcohol.

2. The composition of claim 1 containing a pigment.

3. The composition of claim 2, wherein said pigment is titanium dioxide.

4. The composition of claim 1 wherein said carboxyl modified styrene-butadiene latex is a terpolymer of methacrylic acid, styrene, and butadiene, and said aminoplast is a melamine formaldehyde resin.

5. The composition of claim 4 containing a pigment.

6. The composition of claim 5, wherein said pigment is titanium dioxide.

* * * * *